H. D. Justi,
Making Teeth,
N° 42,491.      Patented Apr. 26, 1864.

Witnesses:
Benj. Morrow
B. F. Shattuck

Inventor:
Henry D. Justi

UNITED STATES PATENT OFFICE.

HENRY D. JUSTI, OF PHILADELPHIA, PENNSYLVANIA.

IMPROVEMENT IN MOLDING ARTIFICIAL TEETH.

Specification forming part of Letters Patent No. 42,491, dated April 26, 1864.

*To all whom it may concern:*

Be it known that I, HENRY D. JUSTI, of the city of Philadelphia, in the State of Pennsylvania, have invented a new and useful Improvement in Molding Artificial Teeth; and I do hereby declare that the following is a full, clear, and exact description of the same reference being had to the accompanying drawings, making a part of this specification, in which—

Figure 1:
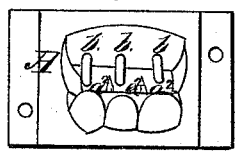
Figure 2:
Figure 3:
Figure 4:

Figure 1 is a plan view of the inner side of the under half of the mold, and Fig. 2 a central transverse section of the same; Fig. 3, a view of the upper or gum edge of a block of teeth formed in the said mold, and Fig. 4 a central transverse section of the same—like letters indicating the same parts when referred to in the different drawings or figures.

The object of my invention is to afford greater facility and accuracy in producing suitable cavities in those blocks of porcelain teeth and gums which are intended to be attached to gutta-percha or prepared caoutchouc bases, and also to afford greater strength around the said cavities.

It consists in the employment of adjustable metallic cores, constructed and applied to the mold in the manner hereinafter described and set forth, so that the said cores will be withdrawn simultaneously with the block of teeth, and can be subsequently and easily withdrawn from the block, leaving the cavities required, and also in molding the parts around the said cavities in the form hereinafter described and set forth, for the purpose of better compensating for the loss of strength which would otherwise be caused by the said cavities.

In the drawings, A is the lower half of the mold, $b\ b\ b$ the metallic cores, $c\ c$ the cavities produced by the cores in the block D as formed in the mold, and $e\ e\ e$ the strengthened parts around the said cavities. The dotted lines $a'$ in Fig. 2 indicate the upper half of the mold. The inner side of the half A of the mold has excavations $a^2\ a^2\ a^2$ made in it of such a form as will produce the tapering and curved projections $e\ e\ e$ along that part of the block D molded therein, which is between the teeth $d'\ d'\ d'$ and the inner side, $d^2$, of the gum above, substantially as represented in the drawings; and directly above each of these excavations $a^2$—be their number more or less—a hole is drilled transversely into the gum part of A for the reception of one end of the metallic core $b$, which is to produce one of the required cavities $c$ in the block D. The metallic cores $b$ are each formed of two cylindrical stems joined together at a right angle, one stem being adapted in size and length to fit loosely either of the said drilled holes in the gum part of the mold A, while the other stem projects into the space which is produced by the excavation $a^2$ and the opposite or counter half of the mold when the two parts A and $a'$ are adjusted together, as indicated in Fig. 2.

Operation: The two said halves A and $a'$ of the mold having been oiled in the usual manner, I first take the metallic cores $b$ and insert the first-mentioned stem of each into the drilled holes, respectively, of the half A, then "fill in" the porcelain body material for the block D, close the two halves of the mold, and submit it to pressure and drying heat in the usual manner well known to the trade. I now open the mold and withdraw the block D, together with the metallic cores $b$, and then carefully withdraw the several cores $b$ from the said block D, thus leaving the cavities $c$, as represented in Fig. 3.

It will therefore be seen that suitable cavities in the block D for receiving the necessary portions of the plastic material of the base to secure the two together can be produced in the described manner with the greatest facility and accuracy, and that the tapering and curved projecting part $e$, which the excavations $a^2$ produce around each hole $c$ in the inner side of the block D, gives ample strength to the cavity without interfering unfavorably with the necessary form of the base of the tooth immediately below it.

Having thus fully described my improvement and shown its utility, what I claim as new therein of my invention, and desire to secure by Letters Patent, is—

1. Molding the cavities $c$, required in the blocks of porcelain teeth and gums, by means of cores $b$, constructed and applied substantially in the manner described and set forth, for the purposes specified.

2. In combination with each of the said cavities $c$, the tapering curved projection $e$ around the same, as described and set forth, for the purpose specified.

HENRY D. JUSTI.

Witnesses:
BENJ. MORISON,
B. F. SHATTUCK.